United States Patent [19]

Fourcade et al.

[11] 3,731,791
[45] May 8, 1973

[54] SECURING OF FIXING ELEMENTS SUCH AS ANCHOR BOLTS

[75] Inventors: Robert Fourcade, Labuissiere; Andre Bourland, Dijon, both of France

[73] Assignees: Societe Explosifs et Produits Chimiques, London, England; Societe Chimiques des Charbonnages de France, Paris, France

[22] Filed: Mar. 15, 1971

[21] Appl. No.: 124,114

Related U.S. Application Data

[63] Continuation-in-part of Ser. No. 18,377, March 13, 1970, abandoned, which is a continuation of Ser. No. 583,826, Oct. 3, 1966, abandoned.

[30] Foreign Application Priority Data

Oct. 5, 1965   Great Britain..................42,301/65
May 9, 1966   France..........................6660832

[52] U.S. Cl. ...............206/47 A, 53/35, 61/45 B, 206/84, 206/DIG. 18, 260/861
[51] Int. Cl. .......................................B65d 81/32
[58] Field of Search................260/861; 61/45 B; 206/DIG. 18, 84, 47 A

[56] References Cited

UNITED STATES PATENTS

| 3,108,443 | 10/1963 | Schuermann et al............61/45 |
| 3,132,195 | 5/1964 | Milligan..........................264/272 |
| 3,194,679 | 7/1965 | Dowling..........................117/72 |
| 3,218,190 | 11/1965 | Patterson et al................117/72 |
| 3,324,663 | 6/1967 | McLean............................61/36 |
| 3,255,029 | 6/1966 | Gorick............................106/290 |
| 3,365,417 | 1/1968 | Gavin et al.....................260/34.2 |

FOREIGN PATENTS OR APPLICATIONS 583,471   12/1946   Great Britain..................260/95

Primary Examiner—Harold D. Anderson
Assistant Examiner—E. A. Nielsen
Attorney—Waters, Roditi, Schwartz & Nissen

[57] ABSTRACT

Sealing cartridges are provided which comprise an outer frangible casing and distributed in the casing, a composition based on an unsaturated polyester resin together with a catalyst composition longitudinally disposed within the casing and in direct contact with the resin composition.

3 Claims, 2 Drawing Figures

SECURING OF FIXING ELEMENTS SUCH AS ANCHOR BOLTS

CROSS REFERENCE TO RELATED APPLICATIONS:

This is a continuation-in-part of Application Ser. No. 18,377, filed Mar. 13, 1970, now abandoned which is a streamlined continuation of application Ser. No. 583,826, filed Oct. 3, 1966, now abandoned.

BACKGROUND OF THE INVENTION

1. Field of the Invention

This invention relates to capsules of resinous composition for use in fixing steel or wood fixing elements in boreholes particularly in the mining industry, and in civil engineering applications.

2. Prior Art

The technique of using tensioned steel bolts to support openings in rock is well known and the use of thermosetting resins to reinforce these steel rockbolts is also well known, and has been disclosed by Dempsey (U.S. Pat. No. 2,952,129). Initially the use of resin for reinforcing mechanical roof bolts involved pre-mixing the reactive components of the resin, transferring them to the borehole by means of a suitable pump and then inserting the fixing element.

Subsequently, Schuerman et al. (U.S. Pat. No. 3,108,443) and McLean (U.S. Pat. No. 3,324,663) have disclosed the use of dual compartment resin packages in which an outer sealed, flexible envelope, contains also an inner sealed, flexible envelope, thus forming two separate compartments for storage, one for each of the reactive components. This dual package may then be inserted into the bolt hole and ruptured by rotation of the fixing element, thereby releasing the two components which are mixed in situ to finally gel and bond the bolt in position.

The capsule of the present invention on the other hand has the two reactive constituents of an unsaturated polyester resin system packed initially in direct contact, with no foreign membrane or packaging film of any kind between them. An initial reaction takes place at the interface between the two constituents, but due to the high level of catalyst and accelerator used in the formulations, and also to the relatively high filler content, the reaction is self-terminating at the interface and does not propagate throughout the polyester resin mass as would be expected from prior art.

The use of a system in which two reactive components are packed in contact to form a layer of reaction product, which prevents further interaction has been disclosed by Capozzi (U.S. Pat. No. 2,862,616) and by Bollmeir et al. (U.S. Pat. No. 3,087,606). Both these prior disclosures refer exclusively to the use of epoxy resin systems, where for example the resin is an epichlorohydrin-bisphenol-A condensate and the hardening agent is a liquid polyamide resin, made from a dimerized fatty acid and a polyamine. In such systems, the ultimate cure is dependent upon thorough mixing of the two reactive constituents since both interreact to form a cross linked thermosetting system. In the case of a polyester resin based system, however, the cross linked theremosetting state is achieved by interaction of the unsaturated polyester base resin with the vinyl monomer in which it is dissolved. The catalysts used to initiate this reaction, which are normally of the organic peroxide type, do not necessarily require to be uniformly distributed throughout the resin mass, since once initiated, the cross linking reaction is self-propagating. Consequently, such systems are well known in the prior art, for example, Dowling (U.S. Pat. No. 3,194,679) and Patterson (U.S. Pat. No. 3,218,190) both make use of the effect to polymerization propagation through a polyester resin mass in achieving resinous surface coatings. In their methods they use a peroxide based primer on the surface to be coated and subsequently apply a heavy coat of uncatalyzed polyester resin. A reaction which is initiated at the contact surface between the resin and the catalyst primer propagates through the resin mass to form an adequately cured surface coating.

DETAILED DESCRIPTION OF THE INVENTION

Figure 1:
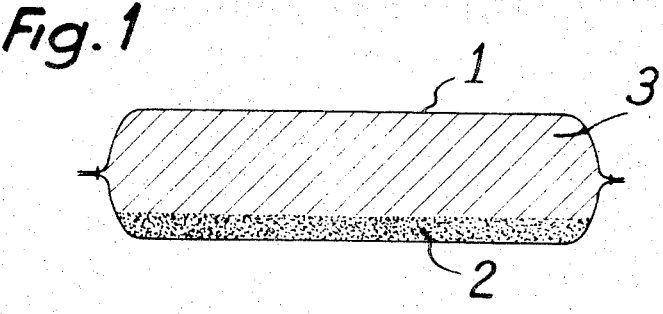
FIGS. 1 and 2 are longitudinal sections through cartridges according to the invention.
Figure 2:
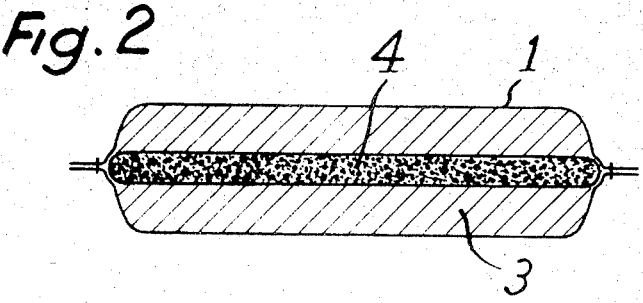

The present invention relates to a sealing cartridge or capsule for an anchor bolt comprising an outer frangible casing, an unsaturated polyester resin based composition distributed in said casing and a catalyst composition longitudinally disposed within the casing and in direct contact with the resinous composition.

It is surprising to discover that in the capsules of this invention the reaction does nor propagate away from the resin catalyst interface but is self-terminating at this point and that capsules may be prepared that have relatively long shelf lives of several months at 25° C, as detailed later in the examples.

The features of the invention are discussed hereafter with reference to the accompanying drawings.

The resins used in the capsules of the invention are readily available commercially and consist of solutions of unsaturated polyester resins in ethylenically unsaturated monomers, stabilized with an inhibitor or mixture of inhibitors. The base polyester resins are the esterification products of diols such as ethylene glycol, propylene glycol, 1:2 butane diol, diethylene glycol etc. with unsaturated dicarboxylic acids or anhydrides such as maleic anhydride, fumaric acid, itaconic acid, dimethyl maleic acid etc., optionally with partial replacement of the unsaturated acid with a saturated dicarboxylic acid or anhydride, such as phthalic anhydride, isophthalic acid, adipic acid, chlorendenic acid etc. The reactive base resin is dissolved in a suitable ethylenically unsaturated monomer or mixture of monomers such as styrene, alpha methyl styrene, vinyl toluene, methyl methacrylate, etc. To prevent premature polymerization of the resin monomer mixture, which may contain from 40–90 percent, but preferably from 55–70 percent, of the base resin, an addition of between 0.001 and 0.05 percent of a suitable inhibitor is incorporated. Suitable inhibitors are well known in the art and are usually chosen from hydroquinone, tert-butyl catechol, mono tertiary butyl hydroquinone and other polyhydric phenols.

A wide range of unsaturated polyester resins, well known in the art may be used for the preparation of the capsules of this invention. The breadth of the range of suitable resins is illustrated by the following table listing the chemical compositions of base polyester resins which have been found to be suitable. The compositions are listed in molar proportions.

|  | 1 | 2 | 3 | 4 | 5 | 6 | 7 | 8 | 9 | 10 |
|---|---|---|---|---|---|---|---|---|---|---|
| Maleic anhydride | 1.0 | 1.0 |  |  | 1.0 | 1.0 | 1.5 |  | 1.0 | 0.7 |
| Phthalic anhydride | 0.5 | 1.0 | 1.0 | 1.0 | 0.5 |  |  |  | 1.0 | 1.8 |
| Fumaric acid |  |  | 1.0 | 1.0 |  |  |  | 1.5 |  |  |
| Isophthalic acid |  |  |  |  |  |  | 1.0 |  |  |  |
| Tetrahydrophthalic acid |  |  |  |  |  | 0.5 | 0.5 |  |  |  |
| Adipic acid |  |  |  |  |  | 0.5 |  |  |  |  |
| Chlorendic acid | 0.5 |  |  |  |  |  |  |  |  |  |
| Ethylene glycol |  |  |  |  | 1.0 |  |  |  | 1.0 |  |
| Diethylene glycol | 0.5 | 0.5 |  | 2.2 |  |  | 2.1 |  |  |  |
| Propylene glycol | 1.5 | 1.5 | 2.4 |  | 2.2 | 1.2 |  | 2.1 | 2.2 | 1.2 |

Following are specific formulations of resins which may be used in the present invention.

RESIN "A"

196g maleic anhydride, 296g phthalic anhydride, 228g propylene glycol and 148g diethylene glycol were charged to a glass reaction vessel fitted with a stirrer, thermometer, and a Dean and Stark distillation unit. Heat was supplied from an electric heating mantle. 200g toluene was added and the temperature raised to 133° C. at which point toluene and toluene/water azeotrope commenced to distill. The water was separated in the Dean and Stark tube and the toluene returned to the reaction vessel. The total quantity of solvent in the system was reduced periodically and the reaction was maintained at this temperature until the acid value had fallen to 35 and the residual toluene was then distilled off rapidly. The reaction mixture was cooled to 90° C, 0.24g hydroquinone stabilizer stirred in and then the resin thinned rapidly with 330g styrene monomer.

RESIN "B"

196g maleic anhydride, 148g phthalic anhydride, 389g hexachoroendomethylenetetrahydrophthalic acid, 228g propylene glycol and 148g diethylene glycol, were charged to a glass reaction vessel fitted with a stirrer, thermometer and a Dean & Stark distillation unit. 100 ml toluene was added and the temperature raised steadily to 138° C at which point distillation of toluene/water azeotrope commenced. The water separated in the Dean & Stark tube and the toluene was returned to the reaction vessel. The reaction temperature was increased steadily over a period of 6 hours to a maximum of 195° C and was maintained at this point for a further 1½ hours until the acid value of the reaction product had fallen to 31 mg KOH/gm. The reaction mixture was then cooled to 90° C, 0.25 gm hydroquinone stabilizer stirred in and then the resin thinned rapidly with 430g styrene monomer.

Next, there are given specific formulations of polyester resin pastes which may be prepared from said resin formulations A and B.

I

| | |
|---|---|
| Polyester Resin "A" | 480g |
| Dimethylaniline | 2g |
| Colloidal Silica | 20g |
| Calcite ( 85% through 200 mesh | 1,680g |
| Styrene monomer | 70g |

II

| | |
|---|---|
| Polyester Resin "A" | 500g |
| Copper Naphthenate solution in styrene (containing 1.0% Cu metal | 5g |
| Styrene monomer | 15g |
| Dimethylaniline | 9g |
| Colloidal silica | 2g |
| Calcite (85% passing 200 mesh) | 1,500g |
| Water | 30g |

III

| | |
|---|---|
| Polyester Resin "A" | 500g |
| Dimethylaniline | 2.5g |
| Calcite (85% through 200 mesh) | 1,500g |
| Colloidal Silica | 3g |

IV

| | |
|---|---|
| Polyester Resin "A" | 500g |
| Dimethylaniline 10g | |
| Colloidal Silica | 3g |
| Dolomite (75% through 200 mesh) | 1,170g |

V

| | |
|---|---|
| Polyester Resin "A" | 500g |
| Dimethylaniline | 9g |
| Styrene monomer | 60g |
| Colloidal Silica | 20g |
| Limestone dust (85% through 200 mesh) | 860g |
| Silica Sand (100% through 60 mesh) | 1,140g |

VI

| | |
|---|---|
| Polyester Resin "A" 500g | |
| Cobalt naphthenate solution (containing 18, Co) | 4g |
| Colloidal Silica | 5g |
| Calcite (85% through 200 mesh) | 1,270g |

VII

| | |
|---|---|
| Polyester Resin "A" | 500g |
| Dimethylaniline | 9g |
| Colloidal Silica | 5g |
| Calcite (85% through 200 mesh) | 1,500g |

VIII

| | |
|---|---|
| Polyester Resin "B" | 500g |
| Dimethylaniline | 9g |
| Antimony Trioxide | 50g |
| Colloidal Silica | 3g |
| Calcite (85% through 200 mesh) | 1,450g |

IX

| | |
|---|---|
| Polyester Resin "B" | 500g |
| Dimethylaniline | 9g |
| Colloidal Silica | 4g |
| Calcite (85% through 200 mesh) | 1,500g |

The catalyst systems used to initiate the copolymerization of the unsaturated polyester resin with the vinyl monomer are organic peroxides with suitable activators. In general, acyl peroxides may be activated at room temperature with tertiary amines and the preferred system for the capsules of this invention consists of benzoyl peroxide activated with dimethylaniline, diethylaniline or dimethyl p- toluidine. Other types of organic peroxides are more successfully activated at room temperature by means of transition metal ions and for the capsules of this invention cyclohexanone peroxide, activated with cobalt ions has been used with some success. Peresters, such as tert-butyl peroctoate have also been used in conjunction with vanadium ion activators. The long term stability of the vanadium compounds in the polyester resin composition is somewhat unreliable and therefore the perester catalysed systems are not recommended for use in capsules where optimum shelf life is essential.

Examples of specific formulations of the peroxide catalyst are as follows:

I

| | |
|---|---|
| Benzoyl Peroxide, 70% in Dimethylphthalate | 100g |
| Castor Oil | 40g |
| Calcite (300 mesh) | 130g |
| Rutile Titanium Dioxide | 2g |

II

| | |
|---|---|
| 50% Benzoyl Peroxide in Dicyclohexylphthalate | 60g |
| Calcite (300 mesh) | 10g |
| Asbestos Fiber | 2.5g |
| Chlorinated Paraffin (65% Cl, M.Wt.385 approx.) | 28g |

III

| | |
|---|---|
| Cyclohexanone Peroxide Paste 50% in dibutylphthalate | 60g |
| Calcite less than 30 microns | 37g |
| Silica Flour | 7g |

IV

| | |
|---|---|
| Benzoyl Peroxide Dispersion in 70% dimethylphthalate | 430g |
| Dolomite less than 30 microns | 370g |
| Dioctyl phthalate | 200g |

V

| | |
|---|---|
| Benzoyl Peroxide 70% dispersion in Dimethylphthalate | 400g |
| Antimony Trioxide | 400g |
| Di-2-ethyl hexyl phthalate | 200g |

VI

| | |
|---|---|
| Hydroxy ethyl cellulose (M.Wt. 100,000) | 2g |
| Water | 100g |
| 50% Benzoyl Peroxide Stable Powder (50% B.P. in dicyclohexylphalate) | 110g |

VII

| | |
|---|---|
| Benzoyl Peroxide 60% in Dimethylphthalate | 500g |
| Calcite passing 300 mesh sieve | 400g |
| Di-2-ethyl hexyl phthalate | 100g |

The resin based composition within the capsule may contain from 30–90 percent, preferably 60–80 percent, of suitable inorganic fillers such as calcite, dolomite, silica sand, slate, calcium sulphate, etc. The principal function of the inorganic filler is to reduce the shrinkage of the resinous mass which always occurs during polymerization. The resinous system containing no filler has a volume shrinkage of 7–8 percent but this is reduced to a level of 1.5–2.0 percent in compositions containing 75 percent of filler. The quantity of filler which may be incorporated is related to its particle size — in general the coarser the filler the greater the proportion which may be included in the resinous composition. In practice, fillers having a particle size distribution from 150 mesh to 300 mesh have been found to be most suitable to ensure filler loadings in the 70–80 percent range while retaining adequate fluidity in the composition. Where necessary the thixotropy of the mixture may be controlled by incorporation of suitable structuring materials such as pyrogenic silica or bentonite clays.

According to the invention, the catalyst may be present in an amount of 4–12 percent by weight based on the resin and the accelerator may be present in an amount of 0.4–2 percent by weight based on resin.

The two reactive components, 2 and 3 packed in direct contact, are enclosed in a suitable tubular outer sheath 1 which has adequate strength to withstand handling during transport and insertion into the borehole but which will disintegrate when subjected to the more severe mechanical action of a rotating steel bolt or other fixing element. The outer capsule sheath is thus torn and distributed throughout the mixed resinous mass in the hole and acts finally as part of the filler in the cured resin plug. Tubular films of cellulose acetate, regenerated cellulose, paper treated with viscose solution, polyamide, polyester or laminates of polyethylene with polyamide or polyester, are particularly suitable for the capsules of this invention. Such tubular films having wall thicknesses between 20 and 100 microns are used for packing sausages and other food products and are thus readily available commercially. Polyethylene films are not suitable since, in general, they are permeable to the preferred vinyl monomers.

A major disadvantage of the known capsules, in which the reactants are contained in separate envelopes, arises from the difficulty of ensuring adequate mixing on insertion of the fixing element. In those cases where the hole diameter is substantially larger than the diameter of the fixing element one of the envelopes can become entwined with the bolt rod without rupturing and consequently polymerization of the resin mass cannot commence. This disadvantage is overcome totally by the capsules of this invention since on rupturing both reactants are immediately available for mixing and initiation of the polymerization is assured.

The unsaturated polyester resin based systems catalysed with benzoyl peroxide/dimethyl aniline of the invention may be formulated within the following limits:

| | Percent by weight |
|---|---|
| 70% Unsaturated polyester resin | 10 – 70 |
| Inorganic filler | 30–90 |
| Dimethyl aniline | 0.1–0.5 |
| Benzoyl peroxide | 1 – 3 |
| Organic extenders | 0 – 10 |
| Thixotropic additives | 0 – 3 |

The unsaturated polyester resin solutions may be prepared by conventional methods as detailed in Examples 1 and 2. The amine accelerator is stirred into the resin and the inorganic fillers incorporated using a dough mixer or Z-blade mixer.

The benzoyl peroxide may be formulated in the forms of pastes, gels, putties or solid rods to suit various capsule requirements. Organic based pastes are prepared by dispersing the organic peroxide and some inorganic fillers in suitable inert fluids such as chlorinated paraffins, caster oil, phthalate esters, etc. Water based pastes may be prepared using stable peroxide powder (commercially available as 50 percent benzoyl peroxide in dicyclohexyl phthalate) dispersed in water thickened with synthetic cellulose ethers or natural gums. Certain of the natural gums may also be cross-linked with sodium borate to form a soft gelled structure in which the peroxide powder is dispersed. Putty-like compositions may be prepared by increasing the proportion of inorganic filler in an organic based paste. Preferably up to 10 percent of the inorganic filler in the catalyst paste may consist of asbestos fibers. Solid rods of catalyst may be prepared by mixing stable peroxide powder with a coarse sand filler and binding with damp clay or with Portland cement and water. Heavy pastes thus prepared may be extruded in conventional ceramic rod extrusion equipment and then dried in warm air to produce rigid rods.

Compositions catalysed with cyclohexanone peroxide and cobalt ions may be formulated within the following limits:

|  | Percent by weight |
|---|---|
| 70% Polyester resin solution | 10 – 70 |
| Inorganic filler | 30 – 90 |
| Cobalt octoate (12% Co.metal) | 0.2 – 2 |
| Cyclohexanone peroxide | 1 – 3 |
| Organic extenders | 0–10 |
| Thixotropic additives | 0–3 |

The filled resin composition containing the cobalt accelerator is prepared in a Z-blade mixer.

The catalyst paste may be presented in the form of organic pastes or putties by methods outlined above for use with benzoyl peroxide.

When the catalyst of either peroxide type is in the form of a paste or gel 2 it may be pumped through conventional gear pumps and co-extruded with the filled resinous composition. Suitable dual extrusion equipment, as detailed in Example 1, enables the resin composition and the catalyst paste to be extruded simultaneously in the desired ratio into a relatively long length of the outer tubular sheath. Capsules of the desired length and weight may then be obtained by crimping the filled sheath at intervals with pairs of metal clips.

When the catalyst is in the form of a flexible putty strip or a rigid rod 4 a different technique is necessary in which the catalyst is placed in pre-cut lengths of sheath and these are subsequently filled with the resinous composition 3 and clipped individually.

The invention is illustrated but not limited by the following examples.

EXAMPLE 1

A polyester resin was prepared by a conventional method.

196g maleic anhydride, 296g phthalic anhydride, 228g propylene glycol and 148 g diethylene glycol were charged to a glass reaction vessel fitted with a stirrer, thermometer, and a Dean and Stark distillation unit. Heat was supplied from an electric heating mantle. 100g toluene was added and the temperature raised to 133° C at which point toluene and toluene/water azeotrope commenced to distil. The water was separated in the Dean and Stark tube and the toluene returned to the reaction vessel. The total quantity of solvent in the system was reduced periodically and the reaction temperature increased progressively to a maximum of 190° C. The reaction was maintained at this temperature until the acid value had fallen to 35 and the residual toluene was then distilled off rapidly. The reaction mixture was cooled to 90° C, 0.24 hydroquinone stabilizer stirred in and then the resin thinned rapidly with 330g styrene monomer.

500g of this polyester resin was charged to a Z-blade mixer together with 9g dimethylaniline, 5g colloidal silica and 1,500 g calcite of mesh size such that 85 percent passed through a 200 mesh British Standard sieve. These components were mixed thoroughly for 20 minutes to form a viscous paste which could be extruded readily through an auger pump.

A catalyst paste was prepared from 430 g of 70 percent benzoyl peroxide dispersion in dimethyl phthalate, 370g dolomite, of mesh size less than 30 microns, and 200 g dioctyl phthalate, thoroughly mixed in a dough mixer. This creamy paste could be metered readily through a gear pump.

An auger pump and a gear pump to handle resin and catalyst pastes, prepared as described, each fitted with variable speed drives were located side-by-side so that the outputs from each could be fed through adjacent parallel feed nozzles of 300mm effective length. The overall outside diameter of this dual nozzle assembly was 27mm. A 3 meter length of nylon 11 tubular film, of layflat width 47 mm was slipped over the dual nozzle and bunched so that the whole length of tubular film was supported on the relatively short nozzle. The pumps were then started and the speeds adjusted so that the filled resin and catalyst paste were extruded side-by-side from the end of the nozzle assembly in the ratio of 15 parts: 1 part by weight respectively. The pumps were stopped and the end of the nylon tubular film drawn past the end of the nozzle and closed with a small metal clip. The pumps were then restarted at the pre-set speeds and the tubular film drawn steadily off the nozzle until the whole length was filled with the two reactive components side-by-side, in contact. Clips were inserted at intervals to divide the continuous filled length of tube into separate capsules each 200 mm long and 30 mm in diameter. These capsules, each containing the two reactive constituents, in contact within the outer casing remained soft and usable for more than 3months at 25° C.

A hole 33 mm in diameter and approximately 1 meter in length was bored into a mass of concrete of 5,000 lbs/in$^2$ compressive strength. A high-tensile steel rod was prepared, 1.3 meters in length and 25 mm diameter, with each end roll-threaded for a length of 150 mm. One of the capsules, prepared as detailed above, was pushed to the end of the hole and the bolt then inserted while rotating at 500 rpm. The bolt was fully home to the end of the hole in 20 seconds and the rotation was then discontinued. Insertion of the bolt in this manner caused thorough mixing of the capsule components and a very rapid reaction, so that the gelling plug of polyester composition could fully support the weight of the bolt within 1 minute. After only 5 minutes an hydraulic tensioning device was attached to the free end of the bolt and a direct tensile load applied at a rate of 1-ton every 15 seconds. The bolt fractured at a tensile load of 42 -tons without detectable movement of the resin anchor.

EXAMPLE 2

A fire retardant polyester resin was prepared by a conventional method.

196g maleic anhydride, 148g phthalic anhydride, 389g hexachloroendomethylenetetrahydrophthalic acid, 228g propylene glycol and 148 g diethylene glycol, were charged to a glass reaction vessel fitted with a stirrer, thermometer and a Dean & Stark distillation unit. 100 ml toluene was added and the temperature raised steadily to 138° C at which point distillation of toluene/water azeotrope commenced. The water separated in the Dean & Stark tube and the toluene was returned to the reaction vessel. The reaction temperature was increased steadily over a period of 6 hours to a maximum of 195° C and was maintained at this point for a further 1½ hours until the acid value of the reaction product had fallen to 31 mg KOH/gm. The reaction mixture was then cooled to 90° C, 0.25 gm hydroquinone stabilizer stirred in and then the resin thinned rapidly with 430 g styrene monomer.

A filled resin paste was prepared to the following formulation:

| | |
|---|---|
| Fire retardant polyester resin | 500 g |
| Dimethylaniline | 9 g |
| Antimony Trioxide | 50 g |
| Colloidal silica | 3 g |
| Calcite (85% through 200 mesh) | 1450 g |

The components were mixed thoroughly for 20 minutes in a Z-blade mixer.

30 mm diameter capsules were prepared using the catalyst paste and method of Example 1. The shelf life and the mechanical performance of the cured resin composition was similar to that reported for the product of Example 1. The fire retardance properties were, however, far superior.

Comparative tests were carried out using cast strips of the mixed product in each case. The specimens were 200 mm long, 12 mm wide and 6 mm thick. Each specimen was clamped horizontally and a flame from a Meker gas burner applied to one end for 5 mins. On removal of the gas burner the product of Example 1 continued to burn for 110 secs. before all flame was extinguished. The product from Example 2, was instantly self extinguishing on removal of the external flame. While apparently of little significance in mining applications this enhanced fire retardance property is preferred for some bolt fixing applications in the building and civil engineering industries.

EXAMPLE 3

The polyester resin of Example 1 was used to prepare a filled mastic of the following composition:

| | |
|---|---|
| Polyester resin | 500g |
| Dimethylaniline | 2.5g |
| Calcite (85% through 200 mesh) | 1500g |
| Colloidal Silica | 3g |

The components were mixed for 20 minutes in a Z-blade mixer to form a smooth paste.

A twin-feed extruder similar to that described in Example 1 was set up with a dual nozzle of 20 m.m. outside diameter. A 2 meter length of cellulose acetate tubular film of layflat width 38 m.m. was shirred onto the feed nozzle.

Using the catalyst paste of Example 1 the resin paste and catalyst were extruded simultaneously into the tubular film casing at a ratio of 15 parts: 1 part by weight. The filled tube was clipped off into capsules each containing 300g of product. The capsules had a usable shelf-life in excess of 3 months at 25° C.

A hole, 28 m.m. in diameter and 1.95 meters in length was drilled in the soft shale roof of a coal mine roadway. Four of the above 24 m.m. diameter capsules were inserted into the hole and retained in position with a small plug of expanded polystyrene. A deformed steel reinforcing bar, 19 m.m. in diameter and 2 meters in length was pushed steadily through the capsules while rotating at approx. 450 r.p.m. Total time of mixing and insertion was 75 seconds. The quantity of resin was sufficient to fully bond the steel bar into the hole over a length of 1.85 meters. After 10 minutes a load was applied to the protruding end of the bar, using a hollow hydraulic ram. The end of the bar failed in tension at an applied load of 16.7 tons without any apparent disturbance of the resin bond.

EXAMPLE 4

A catalyst paste was prepared from 500g of 60 percent benzoyl peroxide dispersion in dimethylphthalate, 400g calcite passing 300 mesh B.S. sieve and 100g di 2 ethyl hexyl phthalate. The components were mixed to a smooth paste in a dough mixer.

A twin feed extruder was set up with a dual nozzle of 33 m.m. outside diameter. A 4 meter length of polyester tubular film of layflat width 63 m.m. was shirred onto the feed nozzle.

The catalyst paste above was extruded simultaneously with the filled polyester resin paste of Example 1 at a weight ratio of 1 part:14 parts respectively. The polyester tubular film was loosely filled with the two components and then clipped into firm capsules 200 m.m. in length, each containing approximately 340g of product. The capsules, each containing the two reactive components, in contact within the outer casing, remained soft and usable for more than 3 months at 25° C.

A hole 43 m.m. in diameter and 1.90 meters in length was drilled in the soft shale roof of a coal mine roadway. To of the 40 m.m. capsules described were pushed to the end of the hole using a steel bolt 20 m.m. in diameter and 2 meters in length. The bolt was rotated at a speed of 500 r.p.m. and pushed steadily through the cartridges of the back of the hole. Total time of rotation was 20 seconds. In 30 seconds the resin had gelled sufficiently to support the weight of the bolt and after a further 4 minutes the bolt was tensioned to a working load of 8.5 tons.

EXAMPLE 5

Using the polyester resin of Example 1 a filled paste was prepared as follows:

| | |
|---|---|
| Polyester Resin | 500g |
| Copper Naphthenate solution in Styrene (containing 1.0% Cu metal) | 5g |
| Styrene monomer | 15g |
| Dimethylaniline | 9g |
| Colloidal silica | 2g |
| Calcite (85% passing 200 mesh) | 1,500g |
| Water | 30g |

A premix was prepared of the resin, copper solution, styrene monomer and dimethylaniline. The calcite was charged to a Z-blade mixer, the water added slowly and mixed with the calcite for 5 minutes. The resin pre-mix and the colloidal silica were then added and the composition mixed for 15 minutes.

40 m.m. diameter capsules, 340 grams in weight were prepared using the catalyst and the method of Example 4. The capsules, each containing the two reactive components in direct contact remained soft and usable for more than 5 months at 25° C.

Tested by the method of Example 4 the product gelled sufficiently to support the bolt in 30 seconds and the fixing could be tensioned to 8½ tons working load after a further 4 minutes.

EXAMPLE 6

A thixotropic resin paste was prepared from the resin of Example 1 using the following composition:

| | |
|---|---|
| Polyester resin | 480g |
| Dimethylaniline | 2g |
| Colloidal Silica | 20g |
| Calcite (85% through 200 mesh) | 1,680g |
| Styrene monomer | 70g |

The composition was mixed in a Z-blade mixer for 15 mins. to produce a soft highly thixotropic product.

A catalyst paste was prepared in a dough mixer using the following formulation:

| | |
|---|---|
| Benzoyl peroxide, 70% in dimethylphthalate | 100g |
| Castor Oil | 40g |
| Calcite (300 mesh) | 130g |
| Rutile titanium dioxide | 2g |

A 3 meter length of polyester tubular film of lay-flat width 50 m.m. was shirred onto the twin feed nozzle of the extruder of Example 1. The two pastes were extruded simultaneously in a weight ratio of 17 parts resin paste to 1 part catalyst paste. The filled polyester casing was then clipped into lengths of 315 m.m. giving capsules 32 m.m. in diameter, each containing 450 g product. The capsules were stable for about 4 months at 25° C.

A hole 40 m.m. in diameter was bored to a depth of 1 meter in a concrete mass. Two of the above resin capsules were placed in the hole and mixed by the rotation and insertion of a ramin wood dowel 30 m.m. in diameter and 1.5 meters in length. The rotation speed was 450 r.p.m. and the total insertion time 35 seconds. The mixed resin, which completely filled the annular space between the dowel and the hole, gelled within 5 minutes. After 50 minutes a tensile load was applied to the dowel, resulting in fracture of the wood at 7½ tons without apparent disturbance of the resin bond.

EXAMPLE 7

A water based catalyst paste was prepared as follows:

| | |
|---|---|
| Hydroxy ethyl cellulose (M.Wt. 100,000) | 2g |
| Water | 100g |
| 50% Benzoyl peroxide stable powder (50% B.P. in dicyclohexylphthalate) | 110g |

The cellulose ether was stirred into the water and allowed to hydrate overnight at ambient temperature to produce a soft gel. The benzoyl peroxide powder was stirred into the gel in a dough mixer to form a soft creamy catalyst paste.

Using the resin paste and the method of Example 6 32 m.m. capsules were prepared containing 450g product in the weight ratio of 15 parts resin paste to 1 part catalyst paste. The capsules were stable for 4 months at 25° C.

The capsules were used in conjunction with 30 m.m. ramin wood dowels to stabilize a badly broken weak area on a long-wall coalface. A pattern of holes, each 38 m.m. diameter and 1.95 meters long, was drilled horizontally into the coalface at 0.6 meter centers throughout the faulted area. Each hole was charged with four capsules and a dowel, 2 meters in length, inserted with rotation to fully mix the resinous composition. In each case the resin fully bonded the dowel in the hole and all were set hard within 25 minutes from insertion of the dowel. The pattern of resin bonded dowels served to reinforce the coalface so that after the next passage of the coal cutting machine a relatively firm stable face was presented. The coal cutting machine is of course able to cut through the bonded dowels, so that they may be used freely in areas where it would be impossible to utilize steel bolts.

EXAMPLE 8

A fire retardant polyester resin was prepared by a conventional method.

196g maleic anhydride, 148g phthalic anhydride, 389g hexachloroendomethylenetetrahydrophthalic acid, 228g propylene glycol and 148g diethylene glycol, were charged to a glass reaction vessel fitted with a stirrer, thermometer and a Dean & Stark distillation unit. 100 ml toluene was added and the temperature raised steadily to 138° C at which point distillation of toluene/water azeotrope commenced. The water separated in the Dean & Stark tube and the toluene was returned to the reaction vessel. The reaction temperature was increased steadily over a period of 6 hours to a maximum of 195° C and was maintained at this point for a further 1½ hours until the acid value of the reaction product had fallen to 31 mg KOH/gm. The reaction mixture was then cooled to 90° C, 0.25 gm hydroquinone stabilizer stirred in and then the resin thinned rapidly with 430 g styrene monomer.

A filled resin paste was prepared to the following formulation:

| | |
|---|---|
| Fire retardant polyester resin | 500g |
| Dimethylaniline | 9g |
| Antimony Trioxide | 50g |
| Colloidal silica | 3g |
| Calcite (85% through 200 mesh) | 1450g |

The components were mixed thoroughly for 20 minutes in a Z-blade mixer.

30 m.m. diameter capsules were prepared using the catalyst paste and method of Example 1. The shelf life and the mechanical performance of the cured resin composition was similar to that reported for the product of Example 1. The fire retardance properties were, however, far superior.

Comparative tests were carried out using cast strips of the mixed product in each case. The specimens were 200 m.m. long, 12 m.m. wide and 6 m.m. thick. Each specimen was clamped horizontally and a flame from a Meker gas burner applied to one end for 5 mins. On removal of the gas burner the product of Example 1 continued to burn for 110 secs. before all flame was extinguished. The product from Example 8 was instantly self extinguishing on removal of the external flame. While apparently of little significance in mining applications this enhanced fire retardance property is preferred for some bolt fixing applications in the building and civil engineering industries.

EXAMPLE 9

Using the resin of Example 8 a filled resin paste was formulated as follows:

| | |
|---|---|
| Fire retardant polyester resin | 500g |
| Dimethylaniline | 9g |
| Colloidal silica | 4g |
| Calcite (85% through 200 mesh) | 1500g |

The components were mixed to a smooth paste in a Z-blade mixer.

A catalyst paste was prepared as follows:

| | |
|---|---|
| 70% Benzoyl peroxide dispersion in dimethylphthalate | 400g |
| Antimony trioxide | 400g |
| Di 2 ethylhexyl phthalate | 200g |

The components were mixed to a smooth paste in a dough mixer.

Capsules prepared by the method of Example 1 were identical in shelf life and mechanical and fire retardant properties to those described in Example 8.

EXAMPLE 10

Using the resin of Example 1 a filled resin paste was prepared according to the following formulation.

| | |
|---|---|
| Polyester resin | 500g |
| Dimethylaniline | 9g |
| Styrene monomer | 60g |
| Colloidal silica | 20g |
| Limestone dust (85% through 200 mesh) | 860g |
| Silica Sand (100% through 60 mesh) | 1140g |

The components were mixed for 20 mins. in a Z-blade mixer.

A dual feed extruder was set up with a nozzle diameter of 18 m.m. A 2 meter length of Nylon 11 tubular film of layflat width 35 m.m. was shirred onto the nozzle. The above resin mix was extruded into the Nylon film simultaneously with the catalyst paste of Example 1 in the width ratio of 16:1. The filled length of casing was clipped into capsules 22.5 m.m. in diameter and 80 m.m. in length, each containing 60g product.

A hole 25 m.m. diameter and 120 m.m. deep was drilled with a rotary drill into a concrete mass of compressive strength 5,000 p.s.i. A 60g capsule was placed in the hole and was mixed by insertion with rotation at 500 r.p.m. of a mild steel stud of 19 m.m. diameter and 150 m.m. length. The inner end of the stud was deformed with a coarse rolled thread, which gave an effective overall diameter of 21 m.m., for a length of 40 m.m. The total time for mixing and insertion of the stud was 15 secs. and the resin mass gelled within 1 minute. A direct tensile load was applied to the stud after 15 minutes, the fixing failing at a load of 6½ tons with partial failure of the surrounding concrete. A series of tests with these capsules gave results consistently in excess of 5 tons whereas comparable tests using capsules prepared from the resin paste of Example 1 were very inconsistent and gave results ranging from 2 to 7 tons. It was observed that in all cases where low loads were recorded the failure occurred by withdrawing the resin plug complete from the hole whereas with the higher loads the resin itself failed in shear. The failure at the concrete/resin plug interface is thought to arise from the presence of fine drilling dust which is compacted into the side of the hole when using rotary drills without air-flush. The improved performance of the capsules of this Example presumably arises from the scouring effect achieved by the presence of a high propertion of silica sand filler. While mixing the capsule the abrasive action of the sand tends to remove the compacted dust from the hole and incorporate it into the resin mix.

EXAMPLE 11

A catalyst paste was prepared as follows:

| | |
|---|---|
| 50% Benzoyl peroxide in dicyclohexylphthalate | 60g |
| Calcite (300 mesh) | 10g |
| Asbestos Fiber | 2.5g |
| Chlorinated paraffin (65% Cl, M.Wt.385 approx.) | 28g |

The components were mixed for 30 mins. in a dough mixer to produce a damp crumble. This material was fed to a conventional screw extruder of the type used for extrusion of clay mixes in the ceramics industry. The material was extruded as a very stiff putty in a continuous strip of 8 m.m. diameter circular section.

The following components were mixed in Z-blade mixer to form a low viscosity filled resin composition.

| | |
|---|---|
| Polyester Resin (of Example 1) | 500g |
| Dimethylaniline | 10g |
| Colloidal Silica | 3g |
| Dolomite (75% through 200 mesh) | 1170g |

Polyester tubular film of layflat width 40 m.m. was cut into lengths of 270 m.m. and one end of each length heat sealed. The catalyst putty strip was cut into lengths of 250 m.m. and one length inserted into each sealed tube. Each tube was then filled with the low viscosity resin composition and closed with a metal clip. After standing for 1 hour it was found that the layer of gelled material around the catalyst strip imparted a considerable degree of longitudinal rigidity to the resin capsule which facilitated the insertion of the capsules into vertical holes.

A 28 m.m. hole, 1.40 meters in length was drilled into the soft shale roof of a coal mine roadway. Two resin capsules were inserted and retained at the back of the hole by a polystyrene foam plug. The capsules were mixed by insertion with rotation at 600 r.p.m. of a 19 m.m. steel bar, 1.50 meters long having a rolled up coarse thread over a length of 150 m.m. from the tip of the bolt. The resin cured sufficiently to support the weight of the bolt within 45 seconds and a direct tensile load applied after 15 mins. resulted in fracture of the bolt at 16 tons load.

What is claimed is:

1. A sealing cartridge or capsule for an anchor bolt comprising an outer frangible casing, a paste comprising a polyester of an unsaturated dicarboxylic acid, an unsaturated monomer and a filler or thickener, and an organic peroxide catalyst composition longitudinally disposed within the casing, said unsaturated polyester paste composition and said organic peroxide catalyst composition being separated solely by a layer of reaction product formed on bringing said catalyst composition in direct contact with the resinous composition.

2. A sealing cartridge as claimed in claim 1 wherein said filler is an organic filler and the unsaturated polyester based resin composition further comprises an accelerator, the catalyst composition being in the form of a layer of catalyst paste.

3. A sealing cartridge as claimed in claim 1 wherein the organic peroxide catalyst composition is in the form of a rod.

* * * * *